(12) United States Patent
Bastelberger et al.

(10) Patent No.: US 9,593,046 B2
(45) Date of Patent: Mar. 14, 2017

(54) USE OF POLYPROPYLENE OXIDE OR ETHYLENE OXIDE-PROPYLENE OXIDE COPOLYMERS IN COMBINATION WITH STARCH ETHER DERIVATIVES AS ADDITIVE IN DRY MORTAR COMPOSITIONS

(75) Inventors: Thomas Bastelberger, Emmerting (DE); Reinhard Härzschel, Burghausen (DE); Xi Zhang, Shanghai (CN)

(73) Assignee: Wacker Chemie AG, Munich (DE)

( * ) Notice: Subject to any disclaimer, the term of this patent is extended or adjusted under 35 U.S.C. 154(b) by 59 days.

(21) Appl. No.: 14/390,595

(22) PCT Filed: Apr. 5, 2012

(86) PCT No.: PCT/CN2012/073518
§ 371 (c)(1),
(2), (4) Date: Oct. 16, 2014

(87) PCT Pub. No.: WO2013/149377
PCT Pub. Date: Oct. 10, 2013

(65) Prior Publication Data
US 2015/0166413 A1    Jun. 18, 2015

(51) Int. Cl.
| | | |
|---|---|---|
| C04B 24/32 | (2006.01) |
| C04B 24/28 | (2006.01) |
| C04B 24/38 | (2006.01) |
| C09D 103/08 | (2006.01) |
| C09J 103/08 | (2006.01) |
| C08L 3/08 | (2006.01) |
| C08L 71/02 | (2006.01) |
| C09J 171/02 | (2006.01) |
| C04B 28/02 | (2006.01) |
| C04B 40/00 | (2006.01) |
| C04B 24/26 | (2006.01) |
| C08L 29/04 | (2006.01) |
| C08L 31/04 | (2006.01) |
| C04B 111/00 | (2006.01) |
| C04B 111/28 | (2006.01) |
| C04B 111/72 | (2006.01) |
| C04B 103/00 | (2006.01) |

(52) U.S. Cl.
CPC .......... *C04B 24/32* (2013.01); *C04B 24/2623* (2013.01); *C04B 24/28* (2013.01); *C04B 24/38* (2013.01); *C04B 28/02* (2013.01); *C04B 40/0042* (2013.01); *C08L 3/08* (2013.01); *C08L 29/04* (2013.01); *C08L 31/04* (2013.01); *C08L 71/02* (2013.01); *C09D 103/08* (2013.01); *C09J 103/08* (2013.01); *C09J 171/02* (2013.01); *C04B 2103/0057* (2013.01); *C04B 2111/00482* (2013.01); *C04B 2111/00637* (2013.01); *C04B 2111/28* (2013.01); *C04B 2111/72* (2013.01); *C08L 2205/035* (2013.01)

(58) Field of Classification Search
CPC ......... C04B 24/32; C04B 24/28; C04B 24/38; C09D 103/08; C09J 103/08; C08L 3/08; C08L 71/02
See application file for complete search history.

(56) References Cited

U.S. PATENT DOCUMENTS

| | | | |
|---|---|---|---|
| 3,663,251 A | 5/1972 | Moren | |
| 4,654,085 A | 3/1987 | Schinski | |
| 5,498,665 A | 3/1996 | Schulze | |
| 5,807,609 A | 9/1998 | Pakusch | |
| 6,699,339 B2 | 3/2004 | Adler | |
| 2002/0121326 A1* | 9/2002 | Adler et al. | 156/39 |
| 2007/0221098 A1 | 9/2007 | Wolbers | |
| 2007/0256600 A1 | 11/2007 | Hedouin | |
| 2008/0090980 A1 | 4/2008 | Willimann | |
| 2009/0223416 A1 | 9/2009 | Aberle | |
| 2010/0234490 A1 | 9/2010 | Gaberlein | |
| 2011/0104378 A1* | 5/2011 | Willimann et al. | 427/385.5 |
| 2011/0160347 A1* | 6/2011 | Bergman et al. | 524/2 |
| 2011/0306705 A1 | 12/2011 | Dombrowski et al. | |

FOREIGN PATENT DOCUMENTS

| | | |
|---|---|---|
| BE | 831773 | 1/1976 |
| CN | 101519296 | 9/2009 |
| CN | 101913812 | 12/2010 |
| CN | 102190468 | 9/2011 |
| DE | 1935507 | 1/1970 |
| DE | 198 12 247 A1 | 9/1999 |
| DE | 102005037777 | 2/2007 |
| DE | 102006013786 | 9/2007 |
| EP | 0573036 | 12/1993 |
| EP | 0698586 | 2/1996 |

(Continued)

OTHER PUBLICATIONS

English Abstract of DE 198 12 247, Sep. 1999.
European Search Report for Application No. 12873738.4 dated Aug. 13, 2015.
International Search Report for PCT/CN2012/073518 dated Jan. 17, 2013.
International Preliminary Report on Patentability for PCT/CN2012/073518 dated Jul. 4, 2014.
Schulze J. in TIZ, No. 9, 1985.

(Continued)

Primary Examiner — John Uselding
(74) Attorney, Agent, or Firm — RatnerPrestia

(57) ABSTRACT

The use of an adhesion-promoting additive combination composed of one or more polyalkylenoxides out of the group comprising polypropylene oxides and ethylene oxide-propylene oxide copolymers, and of one or more starch ether derivatives out of the group comprising carboxyalkyl starch ethers and their alkali salts, and hydroxyalkyl starch ethers, in mortar compositions comprising mineral binders and water-redispersible polymer powders.

8 Claims, No Drawings

(56) References Cited

FOREIGN PATENT DOCUMENTS

| | | |
|---|---|---|
| EP | 1109838 | 6/2001 |
| EP | 1767506 | 3/2007 |
| EP | 1840098 | 10/2007 |
| EP | 2 397 518 A1 | 12/2011 |
| FR | 2818635 | 6/2002 |
| WO | 0104212 | 1/2001 |

OTHER PUBLICATIONS

Polymer Handbook 2nd Edition, J. Wiley & Sons, New York (1975).
Fox T. G., Bull. Am. Physics Soc. 1, 3, p. 123 (1956).

* cited by examiner

USE OF POLYPROPYLENE OXIDE OR ETHYLENE OXIDE-PROPYLENE OXIDE COPOLYMERS IN COMBINATION WITH STARCH ETHER DERIVATIVES AS ADDITIVE IN DRY MORTAR COMPOSITIONS

CROSS-REFERENCE TO RELATED APPLICATIONS

This application is a U.S. National stage application filed under 35 U.S.C. §371, claiming priority under 35 U.S.C. §§119(a) and 365(b) of PCT International application PCT/CN2012/073518, filed Apr. 5, 2012.

FIELD OF THE INVENTION

The invention relates to the use of polypropylene oxide or ethylene oxide-propylene oxide copolymer in combination with one or more starch ether derivatives as an additive in dry mortar compositions comprising water-redispersible polymer powders, particularly in dry mortar compositions, such as ceramic tile adhesives (CTA), exterior thermal insulation composite systems (ETICS) or repair mortars.

BACKGROUND OF THE INVENTION

Important properties of such mortars are good processability of the fresh mortar together with, in the cured mortar compositions, high flexibility and impact resistance, good adhesion to various mineral substrates such as concrete, renders, underlayments, screeds but also tiles and various organic substrates such as insulation materials, in particular to polystyrene boards.

To set an optimal property profile, the formulations on which the adhesive mortars are based are therefore modified with thermoplastic polymers based on ethylenically unsaturated monomers. Dry mortars containing mineral binders are frequently modified with water-redispersible polymer powders based on the abovementioned thermoplastic polymers. This polymer modification gives mortar compositions which meet the above requirements.

In US 2007/0256600 A1, phosphate monoesters, diesters and triesters are used as adhesion promoter for this purpose. However, the high price of these additives and the poor workability of the resulting mortars is a disadvantage.

Improving the adhesion to polystyrene substrates by addition of aromatic polyethers is known from EP 0698586 A1. A disadvantage here is that ecological concerns about the use of such compounds have arisen and the poor workability of the resulting mortars.

It was therefore an object of the invention to improve the adhesion of mortars comprising water-redispersible polymer powders to inorganic and organic substrates, particularly to expanded polystyrene and to mineral wool, and to overcome the abovementioned disadvantages.

Polypropylene oxide (polypropylene glycol) is known as shrinkage-reducing additive from EP 0573036 B1. DE-A 1935507 mentions polypropylene glycol as antifoam for mortar compositions or concrete compositions. In WO 01/04212 A1, a combination of phenol-formaldehyde condensate and polyoxyalkylene compounds is used for improving the redispersibility of water-redispersible polymer powders.

U.S. Pat. No. 4,654,085 discloses an additive combination of cellulose ether, starch ether and polyacrylamide for the improvement of sag resistance in cementitious compositions. EP 1840098 A2 discloses the use of methyl starch ethers for the improvement of the adhesion of mineral binder compositions.

SUMMARY OF THE INVENTION

The subject of the invention is the use of an adhesion-promoting additive combination composed of
one or more polyalkylenoxides out of the group comprising polypropylene oxides and ethylene oxide-propylene oxide copolymers and of
one or more starch ether derivatives out of the group comprising carboxyalkyl starch ethers and their alkali salts, and hydroxyalkyl starch ethers,
in mortar compositions comprising mineral binders and water-redispersible polymer powders.

DETAILED DESCRIPTION OF THE INVENTION

Suitable polypropylene oxides (polypropylene glycols) of the formula $H-[OCH_2CH_2CH_2]_n-OH$ are generally those having n=5 to 70, which corresponds approximately to a weight average molecular weight of from 400 to 4000 g/mol. Preference is given to polypropylene oxides having a weight average molecular weight of from 1000 to 4000 g/mol, particularly preferably from 2000 to 4000 g/mol. Copolymers containing ethylene oxide and propylene oxide monomer units (EO-PO copolymers) and having a weight average molecular weight of from 400 to 4000 g/mol are also suitable. Preference is given to EO-PO copolymers having more than 50 mol % of PO units.

Suitable starch ether derivatives are from the class of hydroxylalkyl starch ether, preferably with a $C_2$- to $C_4$-alkyl group, or carboxyalkyl starch ethers, preferably with a $C_1$- to $C_4$-alkyl group, and their corresponding alkali salts, preferably Na- or K-salt. Particularly preferred starch ether derivatives are hydroxypropyl starch and carboxymethyl starch and its sodium salts. Preference is given to starch ether derivatives having a weight average molecular weight of above 100.000 g/mol, particularly preferably from 200.000 g/mol. The preferred degree of alkyl substitution (DS) of the starch ether derivatives, which is defined as the number of etherified hydroxyl groups in the starch ether derivative per anhydroglucose unit, is 0.1 to 2.0. The preferred degree of hydroxyalkyl molar substitution (MS) of the starch ether derivatives is 0.05 to 1.5. The starch ether derivatives are commercially available and based on potato starch, wheat starch, rice starch, maize starch or tapioca starch or mixtures thereof. Preferred starch ether derivatives are based on potato starch or maize starch.

In general, the polypropylene oxides or ethylene oxide-propylene oxide copolymers are used in an amount of from 0.05 to 5% by weight, preferably from 0.2 to 2% by weight, in each case based on the amount of water-redispersible polymer powder c). In general, the starch ether derivatives are used in an amount of from 0.05 to 5% by weight, preferably from 0.2 to 2% by weight, in each case based on the amount of water-redispersible polymer powder c).

The polymer modified mortars are generally provided as dry mortar compositions and mixed with water on the construction site. Preferably, the dry mortar compositions contain a) one or more mineral binders, b) one or more fillers, c) one or more water-redispersible polymer powders based on polymers of ethylenically unsaturated monomers and having a glass transition temperature Tg of from −25° C. to +35° C. and optionally d) further additives.

Suitable mineral binders a) are, for example, cements, in particular portland cement, high-alumina cement, trass cement, slag cement, magnesia cement, phosphate cement or blast furnace slag cement, and also mixed cements, filler cements, fly ash, microsilica, lime and gypsum plaster. Preference is given to using portland cement, high-alumina cement and slag cement and also mixed cements, filler cements, lime and gypsum plaster. In general, the dry mortar compositions contain from 5 to 50% by weight, preferably from 10 to 30% by weight, of mineral binders, in each case based on the total weight of the dry mortar composition.

Examples of suitable fillers b) are silica sand, quartz flour, calcium carbonate, dolomite, aluminium silicates, clay, chalk, white hydrated lime, talc or mica, and also lightweight fillers such as pumice, foamed glass, gas concrete, perlite, vermiculite, carbon nanotubes (CNTs). It is also possible to use any mixtures of the fillers mentioned. Preference is given to silica sand, quartz flour, calcium carbonate, chalk or white hydrated lime. In general, the dry mortar compositions contain from 30 to 90% by weight, preferably from 40 to 80% by weight, of fillers, in each case based on the total weight of the dry mortar composition.

Further customary additives d) for dry mortar compositions are thickeners, for example polysaccharides such as cellulose ethers and modified cellulose ethers, starch ethers, guar gum, xanthan gum, sheet silicates, polycarboxylic acids such as polyacrylic acid and partial esters thereof and also polyvinyl alcohols which may optionally be acetalized or hydrophobically modified, casein and associative thickeners. Customary additives also include retarders such as hydroxycarboxylic acids or dicarboxylic acids or salts thereof, saccharides, oxalic acid, succinic acid, tartaric acid, gluconic acid, citric acid, sucrose, glucose, fructose, sorbitol, pentaerythritol. A customary additive is setting accelerators, for example alkali metal or alkaline earth metal salts of inorganic or organic acids. Further additives which may be mentioned are: hydrophobicizing agents, preservatives, film formers, dispersants, foam stabilizers, antifoams and flame retardants (e.g. aluminium hydroxide).

The additives d) are used in the customary amounts which depend on the type of additive. In general, the amounts are from 0.1 to 10% by weight, in each case based on the total weight of the dry mortar composition.

Water-redispersible polymer powders c) are powder compositions which are obtained by drying the corresponding aqueous dispersions of the base polymers in the presence of protective colloids. Owing to this production process, the finely divided resin of the dispersion is enveloped in a sufficient amount of a water-soluble protective colloid. On drying, the protective colloid acts like a shell which prevents the particles from sticking together. On redispersion in water, the protective colloid dissovles in water again and an aqueous dispersion of the original polymer particles is obtained (Schulze J. in TIZ, No. 9, 1985).

Suitable polymers of ethylenically unsaturated monomers are polymers based on one or more monomers selected from the group consisting of vinyl esters, (meth)acrylic esters, vinyl aromatics, olefins, 1,3-dienes and vinyl halides and optionally further monomers which can be copolymerized therewith.

Suitable vinyl esters are those of carboxylic acids having from 1 to 15 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms, for example VeoVa9$^R$ or VeoVa10$^R$ (trade names of Resolution). Particular preference is given to vinyl acetate.

Suitable monomers from the group of acrylic esters or meth-acrylic esters are esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinyl aromatics are styrene, methylstyrene and vinyl toluene. A preferred vinyl halide is vinyl chloride. The preferred olefins are ethylene, propylene and the preferred dienes are 1,3-butadiene and isoprene.

From 0.1 to 5% by weight, based on the total weight of the monomer mixture, of auxiliary monomers can optionally also be copolymerized. Preference is given to using from 0.5 to 2.5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonic nitriles, preferably acrylamide and acrylonitrile; monoesters and diesters of fumaric acid and maleic acid, e.g. the diethyl and diisopropyl esters and also maleic anhydride; ethylenically unsaturated sulphonic acids or salts thereof, preferably vinyl sulphonic acid, 2-acrylamido-2-methylpropanesulphonic acid. Further examples are precrosslinking comonomers such as multiply ethylenically unsaturated comonomers, for example diallyl phthalate, divinyl adipate, diallyl maleate, allyl methacrylate or triallyl cyanurate, or postcrosslinking comonomers, for example acrylamidoglycolic acid (AGA), methyl methylacrylamidoglycolate (MMAG), N-methylolacrylamide (NMA), N-methylolmethacrylamide, allyl N-methylolcarbamate, alkyl ethers such as the isobutoxy ether or esters of N-methylolacrylamide, of N-methylolmethacrylamide and of allyl N-methylolcarbamate. Also suitable are epoxy-functional comonomers such as glycidyl methacrylate and glycidyl acrylate. Further examples are silicon-functional comonomers, such as acryloxypropyltri(alkoxy)silanes and methacryloxypropyltri(alkoxy)silanes, vinyl trialkoxysilanes and vinyl methyldialkoxysilanes, where, for example methoxy, ethoxy and ethoxypropylene glycol ether radicals can be present as alkoxy groups. Mention may also be made of monomers having hydroxy or CO groups, for example hydroxyalkyl methacrylates and acrylates such as hydroxyethyl, hydroxypropyl or hydroxybutyl acrylate or methacrylate and also compounds such as diacetoneacrylamide and acetylacetoxyethyl acrylate or methacrylate.

The monomers and the proportion by weight of the comonomers are selected so that a glass transition temperature Tg of from −25° C. to +35° C., preferably from −10° C. to +10° C., particularly preferably from −10° C. to 0° C., results. The glass transition temperature Tg of the polymers can be determined in a known way by means of differential scanning calorimetry (DSC) (determination of the point of inflection of the curve). The Tg can also be calculated approximately beforehand by means of the Fox equation. According to Fox T. G., Bull. Am. Physics Soc. 1, 3, page 123 (1956): $1/Tg=x_1/Tg_1+x_2/Tg_2+\ldots+x_n/Tg_n$, where xn is the mass fraction (% by weight/100) of the monomer n and Tgn is the glass transition temperature in kelvin of the homopolymer of the monomer n. Tg values for homopolymers are given in Polymer Handbook 2nd Edition, J. Wiley & Sons, New York (1975).

Suitable vinyl ester polymers are vinylester homopolymers, particularly polyvinyl acetate, or vinyl ester copolymers of one or more vinyl esters, and one or more comonomers out of the group comprising ethylene, vinyl chloride, and esters of (meth)acrylic acid, the polymers can additionally contain the abovementioned auxiliary monomers in the amounts indicated and the figures in % by weight in each case and up to 100% by weight.

Preference is given to copolymers of vinyl acetate with from 1 to 50% by weight of ethylene;

copolymers of vinyl acetate with from 0 to 50% by weight of ethylene and from 1 to 50% by weight of one or more further comonomers selected from the group consisting of vinyl esters having from 1 to 12 carbon atoms in the carboxylic acid radical, e.g. vinyl propionate, vinyl laurate, vinyl esters of alpha-branched carboxylic acids having from 9 to 13 carbon atoms, e.g. VeoVa9, VeoVa10, VeoVa11;

copolymers of vinyl acetate, with from 1 to 50% by weight of ethylene and preferably from 1 to 60% by weight of (meth)-acrylic esters of unbranched or branched alcohols having from 1 to 15 carbon atoms, in particular n-butyl acrylate or 2-ethylhexyl acrylate; and copolymers of from 30 to 75% by weight of vinyl acetate, with form 1 to 30% by weight of vinyl laurate or vinyl esters of an alpha-branched carboxylic acid having from 9 to 11 carbon atoms and from 1 to 30% by weight of (meth)acrylic esters of unbranched or branched alcohols having from 1 to 15 carbon atoms, in particular n-butyl acrylate or 2-ethylhexyl acrylate, which additionally contain from 0 to 40% by weight of ethylene;

copolymers of from 50 to 95% by weight of vinyl acetate, with from 5 to 50% by weight of (meth)acrylic esters of unbranched or branched alcohols having from 1 to 15 carbon atoms, in particular n-butyl acrylate or 2-ethylhexyl acrylate;

copolymers of vinyl acetate, with from 1 to 50% by weight of ethylene and from 1 to 60% by weight of vinyl chloride; where the polymers can additionally contain the abovementioned auxiliary monomers in the amounts indicated and the figures in % by weight in each case and up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate;

styrene-acrylic ester copolymers, preferably with one or more monomers selected from the group consisting of methyl acrylate, ethyl acrylate, propyl acrylate, n-butyl acrylate, 2-ethylhexyl acrylate;

styrene-1,3-butadiene copolymers;

where the polymers can additionally contain the abovementioned auxiliary monomers in the amounts indicated and the figures in % by weight in each case add up to 100% by weight.

Greatest preference is given to water-redispersible polymer powder c) containing copolymers comprising vinyl acetate and from 5 to 50% by weight of ethylene, or copolymers comprising vinyl acetate, from 0 to 50% by weight of ethylene and from 1 to 50% by weight of a vinyl ester of α-branched monocarboxylic acids having from 9 to 11 carbon atoms, or copolymers comprising from 30 to 75% by weight of vinyl acetate, from 1 to 30% by weight of vinyl laurate or vinyl esters of an alpha-branched carboxylic acid having from 9 to 11 carbon atoms and from 1 to 30% by weight of (meth)acrylic esters of unbranched or branched alcohols having from 1 to 15 carbon atoms, which additionally contain from 1 to 40% by weight of ethylene, or copolymers comprising from 50 to 95% by weight of vinyl acetate, from 5 to 50% by weight of (meth)acrylic esters of unbranched or branched alcohols having from 1 to 15 carbon atoms, or copolymers comprising vinyl acetate, from 5 to 50% by weight of ethylene and from 1 to 60% by weight of vinyl chloride, where the polymers can additionally contain the abovementioned auxiliary monomers in the amounts indicated and the figures in % by weight in each case add up to 100% by weight.

The polymers are prepared by the emulsion polymerization process or by the suspension polymerization process in the presence of protective colloids, preferably by the emulsion polymerization process, in which the polymerization temperature is generally from 20° C. to 150° C., preferably from 60° C. to 90° C., and in which the copolymerization of gaseous comonomers such as ethylene can also be carried out under superatmospheric pressure, generally in the range from 5 bar to 100 bar abs. The polymerization is initiated by means of the water-soluble or monomer-soluble initiators or redox initiator combinations customarily used for emulsion polymerization or suspension polymerization. Examples of water-insoluble initiators are sodium persulphate, hydrogen peroxide. Examples of monomer-soluble initiators are dicetyl peroxydicarbonate, dicyclohexyl peroxydicarbonate, dibenzoyl peroxide, azobisisobutyronitrile. The initiators mentioned are generally used in an amount of from 0.01 to 0.5% by weight, based on the total weight of the monomers. Redox initiators used are combinations of the initiators mentioned with reducing agents. Suitable reducing agents are, for example, sodium sulphite, sodium hydroxymethanesulphinate and ascorbic acid. The amount of reducing agent is preferably from 0.01 to 0.5% by weight, based on the total weight of the monomers.

To control the molecular weight, regulating substances can be used during the polymerization. If regulators are used, these are usually used in amounts in the range from 0.01 to 5.0% by weight, based on the monomers to be polymerized, and are introduced separately or premixed with reaction components.

Examples of such substances are n-dodecyl mercaptan, tert-dodecyl mercaptan, mercaptopropionic acid, methyl mercaptopropionate, isopropanol and acetaldehyde. Preference is given to using no regulating substances.

To stabilize the polymerization mixture, protective colloids are used, optionally in combination with emulsifiers. Suitable protective colloids are partially hydrolysed or fully hydrolysed polyvinyl alcohols; polyvinyl pyrrolidones; polyvinyl acetals; polysaccharides in water-soluble form, e.g. starches (amylose and amylopectin) or dextrins or cyclodextrins, celluloses and carboxymethyl, methyl, hydroxyethyl, hydroxypropyl derivatives thereof; proteins such as casein or caseinate, soya protein, gelatin; lignosulphonates; synthetic polymers such as poly(meth)acrylic acid, copolymers of (meth)acrylates with carboxyl-functional comonomer units, poly(meth)acrylamide, polyvinyl sulphonic acids and water-soluble copolymers thereof; melamine-formaldehyde sulphonates, naphthalene-formaldehyde sulphonates, styrene-maleic acid and vinyl ether-maleic acid copolymers;

cationic protective colloids, for example polymers having monomer units comprising quaternary ammonium groups.

Preference is given to partially hydrolysed or fully hydrolysed polyvinyl alcohols. Particular preference is given to partially hydrolysed polyvinyl alcohols having a degree of hydrolysis of from 80 to 95 mol % and a Höppler viscosity in 4% strength aqueous solution of from 1 to 30 mPas (Höppler method at 20° C., DIN 53015).

After the polymerization is concluded, an after-polymerization can be carried out by known methods, for example by redox catalyst-initiated after-polymerization, to remove residual monomers. Volatile residual monomers can also be removed by means of distillation, preferably under reduced pressure and optionally with inert entrainer gases such as air, nitrogen or steam being passed through or over the mixture. The aqueous dispersions which can be obtained in this way have a solids content of from 30 to 75% by weight, preferably from 50 to 60% by weight.

To produce the water-redispersible polymer powders, the dispersions are, optionally after addition of further protective colloids as drying aids, dried, for example by means of fluidized-bed drying, freeze drying or spray drying. The dispersions are preferably spray dried. Spray drying is carried out in customary spray drying plants, with atomization being able to be effected by means of one-fluid, two-fluid or multifluid nozzles or by means of a rotary disc. The outlet temperature is generally selected in the range from 45° C. to 120° C., preferably from 60° C. to 90° C., depending on the plant, the Tg of the resin and the desired degree of drying. The solids content of the dispersion to be atomized is >35%, preferably >40%.

In general, the drying aid is used in a total amount of from 0.5 to 30% by weight, based on the polymeric constituents of the dispersion, i.e. the total amount of protective colloid before the drying operation should be at least 1 to 30% by weight, based on the polymer component; preference is given to using from 5 to 20% by weight based on the polymer component.

Suitable drying aids are known to those skilled in the art and are, for example, the abovementioned protective colloids. Particular preference is given to partially hydrolysed polyvinyl alcohols having a degree of hydrolysis of from 80 to 95 mol% and a Höppler viscosity in 4% strength aqueous solution of from 1 to 30 mPas (Höppler method at 20° C., DIN 53015).

In atomization, a content of up to 1.5% by weight of antifoam, based on the base polymer, has frequently been found to be advantageous. To increase the storage life by improving the blocking stability, in particular in the case of powders having a low glass transition temperature, the powder obtained can be provided with an antiblocking agent (anticaking agent), preferably in an amount of from 1 to 30% by weight, based on the total weight of polymeric constituents. Examples of antiblocking agents are Ca carbonate or Mg carbonate, talc, gypsum, silica, kaolins such as metakaolin, silicates having particle sizes which are preferably in the range from 10 nm to 10 μm.

The addition of the additive combination to a dry mortar formulation is preferably carried out together with the water-redispersible polymer powder component, most preferred as part of the water-redispersible polymer powder component. For this purpose, the components of the additive combination can be added before or during the preparation of the polymer dispersion by means of polymerization. The components of the additive combination are preferably added to the polymer dispersion before spray drying or the additive combination is added separately during spray drying of the polymer dispersion. The starch ether derivatives are preferably added before spray-drying to the polymer dispersion, most preferred the starch ether derivatives are spray-dried together with the polymer dispersion. The components of the additive combination can be added to the dry polymer powder after drying, too. With these methods a water-redispersible polymer powder is obtained comprising the additive combination.

The dry mortar composition is generally produced by mixing and homogenizing the components a) to d), and optionally the additive combination according to the invention, if this is not added with the water-redispersible polymer powder component, in conventional powder mixing apparatuses to give a dry mortar. The amount of water necessary for processing to give mortars ready for use is added before preparation. It is also possible to mix the individual components a) to d), and optionally the additive combination according to the invention if this is not added with the polymer powder component, separately with water to give a mortar ready for use.

The additive combination can be applied to a solid support material, for example silica, and be added in this form to the water-redispersible polymer powder or to the dry mortar composition.

In the use according to the invention, the additive combination is used to improve the adhesion, without substantial loss of workability, of mortars comprising water-redispersible polymer powders to inorganic and organic substrates, particularly to expanded polystyrene, to mineral wool and to ceramics. Preferably in ceramic tile adhesives (CTA), in exterior thermal insulation composite systems (ETICS) as a component of the adhesive or basecoat mortar, particularly preferred for adhesive bonding and reinforcement of expanded polystyrene boards and rock wool mouldings. A further use is the use in repair mortars.

The following examples serve to illustrate the invention:

In (Comparative) Examples 1 to 4, the following redispersible polymer powders were used:

Dispersion Powder 1:
Dispersion powder based on a vinyl acetate-ethylene copolymer having a Tg of −7° C. together with polyvinyl alcohol protective colloid.

Dispersion Powder 2:
Dispersion powder based on a vinyl acetate-ethylene copolymer having a Tg of −7° C. together with polyvinyl alcohol protective colloid and 0.5% by weight of polypropylene glycol having a weight average molecular weight of about 2000 (Pluriol$^R$ P2000 from BASF), based on dispersion powder.

Dispersion Powder 3:
Dispersion powder based on a vinyl acetate-ethylene copolymer having a Tg of −7° C. together with polyvinyl alcohol protective colloid and 0.5% by weight of polypropylene glycol having a weight average molecular weight of about 2000 (Pluriol$^R$ P2000 from BASF), based on dispersion powder and 2% by weight of the sodium salt of a carboxymethyl starch ether (Hua Yun CMS of Shanghai Huayun Starch Co. Ltd,), based on dispersion powder.

Dispersion Powder 4:
Dispersion powder based on a vinyl acetate-ethylene copolymer having a Tg of −7° C. together with polyvinyl alcohol protective colloid and 0.5% by weight of polypropylene glycol having a weight average molecular weight of about 2000 (Pluriol$^R$ P2000 from BASF), based on dispersion powder and 2% by weight of a hydroxypropyl starch (Hua Yun HPS of Shanghai Huayun Starch Co. Ltd,), based on dispersion powder.

Dispersion powder 5:
Dispersion powder based on a vinyl acetate-ethylene copolymer having a Tg of +17° C. together with polyvinyl alcohol protective colloid.

Dispersion Powder 6:
Dispersion powder based on a vinyl acetate-ethylene copolymer having a Tg of +17° C. together with polyvinyl alcohol protective colloid and 0.5% by weight of polypropylene glycol having a weight average molecular weight of about 2000 (Pluriol$^R$ P2000 from BASF), based on dispersion powder.

Dispersion Powder 7:
Dispersion powder based on a vinyl acetate-ethylene copolymer having a Tg of +17° C. together with polyvinyl alcohol protective colloid and 0.5% by weight of polypropylene glycol having a weight average molecular weight of about 2000 (Pluriol$^R$ P2000 from BASF), based on dispersion powder and 2% by weight of the sodium salt of a hydroxypropyl starch ether (Hua Yun Na-HPS of Shanghai Huayun Starch Co. Ltd), based on dispersion powder.

Dispersion Powder 8:
Dispersion powder based on a vinyl acetate-ethylene copolymer having a Tg of +17° C. together with polyvinyl alcohol protective colloid and 0.5% by weight of polypropylene glycol having a weight average molecular weight of about 2000 (Pluriol$^R$ P2000 from BASF), based on dispersion powder and 2% by weight of a hydroxypropyl starch ether (Hua Yun HPS of Shanghai Huayun Starch Co. Ltd,), based on dispersion powder.

To produce the ready-to-use mortars, in a recipe for an adhesive mortar for ETICS, for (Comparative) Examples 1 to 5, the constituents indicated in Table 1 were in each case mixed in the amounts indicated there with the amounts of water indicated in Table 1 to give the mortar ready for use.

To test the adhesive mortars for ETICS, they were in each case applied as basecoat mortar in a layer thickness of 4 mm to EPS (expanded polystyrene) boards.

The specimens were stored under two different conditions: 14 days under standard conditions at 23° C. and 50% relative humidity (SC),
or 12 days under standard conditions and subsequently for 2 days in water at 23° C.

After storage of the test specimens, the adhesive pull strength and the pull-out on EPS boards were determined in accordance with the test method in DIN 18555-6.

The test samples of the respective test specimen were drilled with a crown drill (diameter: 55 mm). Staples were bonded to the test sample and drawn off by a tensile testing machine (type: Herion) with preselected rate of load increase. From the measured pull-off strength and area of the test sample, the corresponding bond strength according to DIN 18555-6 revealed.

The results of testing are summarized in Table 1.

The results show that the adhesion to the thermal insulation board is significantly improved when using the mortars which have been modified according to the invention (Examples 3 and 4). To be seen by comparison of the adhesive pull strengths and EPS pull-out of Comparative Examples 1 and 2 with those of Examples 3 and 4. In particular, the adhesion is weakened only insignificantly after storage in water (Ex. 3, Ex. 4), while in the case of the comparative example 1, the quality of the adhesive bond, which is in any case already low, deteriorates significantly further after storage in water (see EPS pull-out). In the case of comparative example 2, the quality of the adhesive bond is sufficiently high, but the workability is reduced to an unacceptable level.

With higher amounts of MC (comp. ex. 5, the workability of the mortar is somewhat improved, but the quality of the adhesion bond is greatly reduced to an unacceptable level.

To produce the ready-to-use tile adhesive mortars for (Comparative) Examples 6 to 10, the constituents indicated in Table 2 were in each case mixed in the amounts indicated there with the amounts of water indicated in Table 2 to give the mortar ready for use.

Determination of the Adhesive Strengths:
To test the adhesive strength, the tile adhesive mortars were applied to concrete slabs with a 5 mm toothed spatula. Thereafter, stoneware tiles of 5×5 cm$^2$ were laid and weighted with a 2 kg weight for 30 seconds. The tiles were then kept under the conditions given in Table 2. The adhesive strength was determined in accordance with EN 12004 after storage using a pull-off apparatus from Herion with a load increase rate of 250 N/s. The measurement values in N/mm$^2$ are shown in Table 2.

The results show that the adhesive strength of comparative example 6 is much lower than that of comparative example 7 and examples 8 and 9. Comparative example 7 shows reduced tensile strength in comparison with examples 8 and 9, but the workability is reduced to an unacceptable level.

With higher amounts of MC (comp. ex. 10), the workability of the mortar is somewhat improved, but the quality of the adhesion bond is greatly reduced to an unacceptable level.

TABLE 1

| | C. Ex. 1 | C. Ex. 2 | Ex. 3 | Ex. 4 | C. Ex. 5 |
|---|---|---|---|---|---|
| Formulation (constituents in parts by weight) | | | | | |
| White cement 42, 5 | 283.5 | 283.5 | 283.5 | 283.5 | 283.5 |
| Silica sand AKW 9a | 510 | 510 | 510 | 510 | 509 |
| Calcium carbonate MHS | 190 | 190 | 190 | 190 | 190 |
| Cellulose ether MH10001P4 | 1.5 | 1.5 | 1.5 | 1.5 | 2.5 |
| Dispersion powder 1 | 15 | | | | |
| Dispersion powder 2 | | 15 | | | 15 |
| Dispersion powder 3 | | | 15 | | |
| Dispersion powder 4 | | | | 15 | |
| Water in ml per 1000 g | 220 | 220 | 220 | 220 | 240 |
| Test results: | | | | | |
| Adhesive pull strength N/mm$^2$ (14 days SC) | 0.07 | 0.11 | 0.11 | 0.12 | 0.08 |
| Adhesive pull strength N/mm$^2$ (12 d SC + 2 d H$_2$O) | 0.04 | 0.10 | 0.09 | 0.10 | 0.05 |
| EPS pull-out % (14 d SC) | 10 | 85 | 90 | 95 | 20 |
| EPS pull-out % (12 d SC + 2 d H$_2$O) | 5 | 80 | 75 | 80 | 15 |
| Workability in arbitrary notes from 1 to 5 (5 being the best) | 5 | 2 | 4.5 | 4.5 | 3 |

TABLE 2

| | C. Ex. 6 | C. Ex. 7 | Ex. 8 | Ex. 9 | C. Ex 10 |
|---|---|---|---|---|---|
| Formulation (constituents in parts by weight) | | | | | |
| Portland cement CEM I 42, 5R | 350 | 350 | 350 | 350 | 350 |
| Silica sand F 34 | 482.5 | 482.5 | 482.5 | 482.5 | 480.5 |
| Durcal 65 (CaCO$_3$; | 156 | 156 | 156 | 156 | 156 |

TABLE 2-continued

|  | C. Ex. 6 | C. Ex. 7 | Ex. 8 | Ex. 9 | C. Ex 10 |
|---|---|---|---|---|---|
| 60 µm) |  |  |  |  |  |
| Cellulose ether C 8564 | 4 | 4 | 4 | 4 | 6 |
| Dispersion powder 5 | 7.5 |  |  |  |  |
| Dispersion powder 6 |  | 7.5 |  |  | 7.5 |
| Dispersion powder 7 |  |  | 7.5 |  |  |
| Dispersion powder 8 |  |  |  | 7.5 |  |
| Water in ml per 1000 g | 230 | 230 | 230 | 230 | 250 |
| Test results: |  |  |  |  |  |
| Adhesive pull strength N/mm² (28 days SC) | 0.74 | 1.08 | 1.12 | 1.22 | 0.64 |
| Adhesive pull strength N/mm² (7 d SC + 21 d H₂O) | 0.77 | 0.97 | 1.05 | 0.96 | 0.58 |
| Adhesive pull strength N/mm² (14 d SC + 14 d 70° C. + 1 d SC) | 0.59 | 0.94 | 1.07 | 1.12 | 0.60 |
| Adhesive pull strength N/mm² (7 d SC + 21 d H₂O + 25 freeze/thaw cycles) | 0.34 | 0.82 | 0.96 | 1.04 | 0.41 |
| Workability in arbitrary notes from 1 to 5 (5 being the best) | 5 | 2 | 4.5 | 4 | 2.5 |

The invention claimed is:

1. A dry mortar composition comprising:
   a) 5 to 50% by weight, based on the total weight of the dry mortar composition, of a mineral binder;
   b) 30 to 90% by weight, based on the total weight of the dry mortar composition, of filler;
   c) a spray-dried water-redispersible polymer powder comprising a copolymer selected from the group consisting of (i) copolymers of vinyl acetate and from 5 to 50% by weight of ethylene, (ii) copolymers of vinyl acetate and from 0 to 50% by weight of ethylene and from 1 to 50% by weight of a vinyl ester of alpha-branched monocarboxylic acids having from 9 to 11 carbon atoms, (iii) copolymers of 30 to 75% by weight of vinyl acetate and from 1 to 30% by weight of vinyl laurate or vinyl esters of an alpha-branched carboxylic acid having from 9 to 11 carbon atoms and from 1 to 30% by weight of (meth)acrylic esters of unbranched or branched alcohols having from 1 to 15 carbon atoms and from 0 to 40% by weight of ethylene, (iv) copolymers of 50 to 95% by weight of vinyl acetate and from 5 to 50% by weight of (meth)acrylic esters of unbranched or branched alcohols having from 1 to 15 carbon atoms, and (v) copolymers of vinyl acetate and from 5 to 50% by weight of ethylene and from 1 to 60% by weight of vinyl chloride, wherein the copolymers can additionally contain auxiliary monomers and weight percents in each case add up to 100% by weight; and an adhesion-promoting additive combination, said additive composition comprising:
   one or more polyalkylenoxides out of the group comprising polypropylene oxides and ethylene oxide-propylene oxide copolymers; and
   one or more starch ether derivatives out of the group comprising carboxyalkyl starch ethers and their alkali salts, and hydroxyalkyl starch ethers, and
   wherein the water-redispersible polymer powder comprises the adhesion promoting additive combinations.

2. The mortar composition of claim 1, wherein the additive combination comprises one or more starch ether derivatives selected from the group comprising hydroxypropyl starch, carboxymethyl starch, and their sodium salts.

3. The mortar composition of claim 1, comprising a dry mortar composition comprising a) one or more mineral binders, b) one or more fillers, c) one or more water-redispersible polymer powders based on polymers of ethylenically unsaturated monomers and having a glass transition temperature $T_g$ of from −25° C. to +25° C. and optionally d) further additives.

4. The mortar composition of claim 1, wherein the mortar composition is a ceramic adhesive, an exterior thermal insulation composite system, or a repair mortar.

5. A method of making a dry mortar composition by combining:
   a) 5 to 50% by weight, based on the total weight of the dry mortar composition, of a mineral binder;
   b) a spray-dried water-redispersible polymer powder comprising a copolymer selected from the group consisting of (i) copolymers of vinyl acetate and from 5 to 50% by weight of ethylene, (ii) copolymers of vinyl acetate and from 0 to 50% by weight of ethylene and from 1 to 50% by weight of a vinyl ester of alpha-branched monocarboxylic acids having from 9 to 11 carbon atoms, (iii) copolymers of 30 to 75% by weight of vinyl acetate and from 1 to 30% by weight of vinyl laurate or vinyl esters of an alpha-branched carboxylic acid having from 9 to 11 carbon atoms and from 1 to 30% by weight of (meth)acrylic esters of unbranched or branched alcohols having from 1 to 15 carbon atoms and from 0 to 40% by weight of ethylene, (iv) copolymers of 50 to 95% by weight of vinyl acetate and from 5 to 50% by weight of (meth)acrylic esters of unbranched or branched alcohols having from 1 to 15 carbon atoms, and (v) copolymers of vinyl acetate and from 5 to 50% by weight of ethylene and from 1 to 60% by weight of vinyl chloride, wherein the copolymers can additionally contain auxiliary monomers and weight percents in each case add up to 100% by weight, and an adhesion-promoting additive combination, said additive composition comprising:
   one or more polyalkylenoxides out of the group comprising polypropylene oxides and ethylene oxide-propylene oxide copolymers; and
   one or more starch ether derivatives out of the group comprising carboxyalkyl starch ethers and their alkali salts, and hydroxyalkyl starch ethers.

6. The method of claim 5, wherein the additive combination comprises one or more starch ether derivatives selected from the group comprising hydroxypropyl starch, carboxymethyl starch, and their sodium salts.

7. The method of claim 5, wherein the dry mortar composition comprises 30 to 90% by weight, based on the total weight of the dry mortar composition, of one or more fillers, and the one or more water-redispersible polymer powders based on polymers of ethylenically unsaturated monomers have a glass transition temperature $T_g$ of from −25° C. to +25° C.

8. The method of claim 5, wherein the dry mortar composition is a ceramic tile adhesive, an exterior thermal insulation composite system, or a repair mortar.

* * * * *